US012693433B2

(12) United States Patent
Alagarsamy

(10) Patent No.: US 12,693,433 B2
(45) Date of Patent: Jul. 28, 2026

(54) DYNAMIC DOSE ANALYSIS FOR DOSIMETER

(71) Applicant: Thermo Scientific Portable Analytical Instruments Inc., Tewksbury, MA (US)

(72) Inventor: Siva Alagarsamy, Solon, OH (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 919 days.

(21) Appl. No.: 17/938,069

(22) Filed: Oct. 5, 2022

(65) Prior Publication Data

US 2023/0120450 A1    Apr. 20, 2023

Related U.S. Application Data

(60) Provisional application No. 63/256,732, filed on Oct. 18, 2021.

(51) Int. Cl.
*G01T 1/02*        (2006.01)
*G01T 1/17*        (2006.01)

(52) U.S. Cl.
CPC . *G01T 1/02* (2013.01); *G01T 1/17* (2013.01)

(58) Field of Classification Search
CPC ..................................... G01T 1/17; G01T 1/02
See application file for complete search history.

(56) References Cited

U.S. PATENT DOCUMENTS 4,464,777 A * 8/1984 Machida .............. A61B 6/0487
                                                    378/146
4,797,905 A * 1/1989 Ochmann ................ H05G 1/46
                                                    378/112

2015/0182182 A1 * 7/2015 Tajima ................... A61B 6/542
                                                    378/189
2017/0231584 A1 * 8/2017 Konno ................. A61B 6/4241
                                                    378/5
2018/0267174 A1    9/2018 Liang et al.

FOREIGN PATENT DOCUMENTS

CN            104068881 A    10/2014
KR         20150125131 A    11/2015
WO    WO-2020142728 A1     7/2020

OTHER PUBLICATIONS

PCT/US2022/077565, International Search Report and Written Opinion, Jan. 17, 2023, 11 pages.

* cited by examiner

*Primary Examiner* — Carolyn Fin

(57)            ABSTRACT

Provided are systems and methods for dynamically tracking radiation exposure and dose history. Various methods and embodiments can be implemented on dosimeters, wearable devices, and radiation measurement systems. In accordance with embodiments, the present invention can include a sensor configured to measure a radiation level, at least one memory storing dosage rates, and a processor in communication with the memory and the sensor. The processor can be configured to at least: determine a dosage rate based on a plurality of radiation level measurements taken over a period of time; determine a sample frequency based on a function of the dosage rate; continuously measure the radiation levels using the sample frequency and update the dosage rate; and dynamically adjust the sample frequency based on the updated dosage rate.

20 Claims, 6 Drawing Sheets

200B

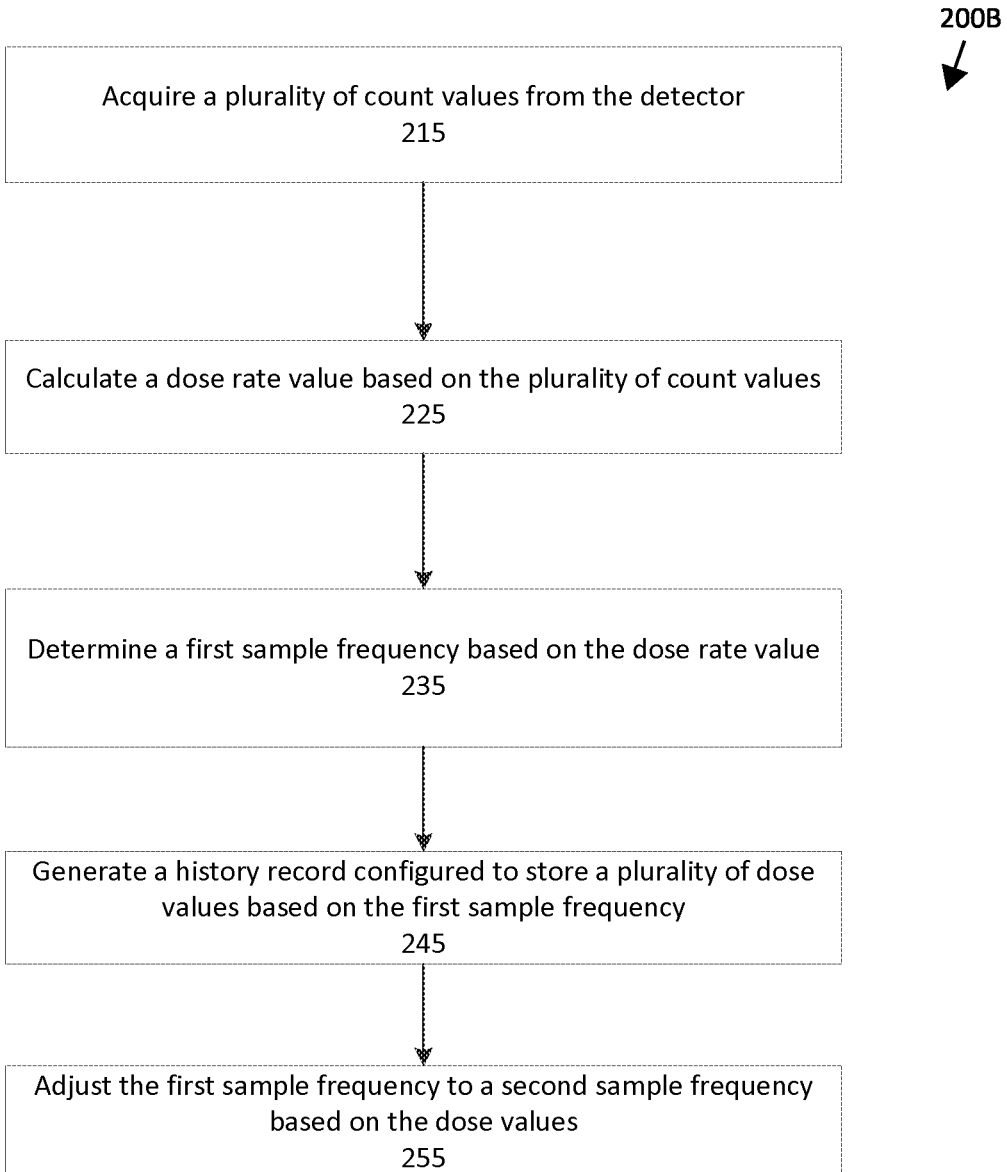

Acquire a plurality of count values from the detector
215

Calculate a dose rate value based on the plurality of count values
225

Determine a first sample frequency based on the dose rate value
235

Generate a history record configured to store a plurality of dose values based on the first sample frequency
245

Adjust the first sample frequency to a second sample frequency based on the dose values
255

DYNAMIC DOSE ANALYSIS FOR DOSIMETER

CROSS-REFERENCE TO RELATED APPLICATIONS

This application claims priority to U.S. application No. 63/256,732 filed Oct. 18, 2021, which disclosure is herein incorporated by reference in its entirety.

TECHNICAL FIELD

The present disclosure generally relates to tracking dosage measurements using dosimeters.

BACKGROUND

Dosimeters measure exposure to ionizing radiation and can provide indications regarding cumulative dosage and/or current dose rate. Dosimeters can be personal devices, e.g., worn on an individual, to measure radiation dosage and/or to help ensure safe exposure levels. They can also be provided at a location to measure radiation levels in a certain area, such as a laboratory, testing site, or other area where measuring radiation exposure is of interest.

In some electronic dosimeters, dosage history can be collected, e.g., to provide insight related to dosage amounts and changes over a period of time. Dose history can provide useful information to investigate any high dose incidents or to analyze how different activities during the day is affecting the radiation exposure for a user. Some dosimeters can save dose history samples in a memory at periodic intervals to capture how the dose increased over a period. However, many dosimeters have limited memory and can therefore only store a limited number of dose history samples.

In addition, sample frequency is often fixed, with samples being taken at set intervals. While such time intervals can be adjusted, several shortcomings remain with fixed sampling periods. For example, saving dose history too often (i.e., shorter sample time intervals) can lead to having dose history for a shorter period. Saving dose history samples at a longer interval will reduce precision and may not provide enough time precision to identify high dose events. This makes it difficult for users to select a dose history sample period that will meet their need.

Moreover, users are typically most interested in dose history when the dosage received is higher than normal. However, traditional dosimeters with static sampling methods at fixed time intervals are unable to provide additional information and/or distinctions based on dosage. Interpretation of dose history and analyses regarding does changes over time are also inherently limited, due to traditional sampling methods, and limited numbers of samples, e.g., due to limited memory. Accordingly, there is a long-felt need in the art for improved methods and systems for dosimeter dosage measurements and analyses.

SUMMARY

In meeting the described challenges, the present disclosure first provides systems and methods for dynamically tracking radiation exposure. Embodiments of the present invention can include a sensor configured to measure a radiation level, at least one memory storing dosage rates, and a processor in communication with the memory and the sensor. The processor can be configured to at least: determine a dosage rate based on a plurality of radiation level measurements taken over a period of time: determine a sample frequency based on a function of the dosage rate: continuously measure the radiation levels using the sample frequency and update the dosage rate; and dynamically adjust the sample frequency based on the updated dosage rate. The present disclosure also provides systems and methods.

Additionally provided are systems and methods for measuring radiation levels at a first sample frequency when the dosage rate is determined to be within a first range of values; and measuring radiation levels at a second sample frequency when the dosage rate determined to be within a second range of values, the second range of values being greater than the first range of values, wherein the second sample frequency is greater than the first sample frequency. Systems and methods can further comprise measuring radiation levels at a third sample frequency when the dosage rate is determined to be within a third range of values, wherein the third sample frequency is greater than the second sample frequency. In embodiments the ranges can be less than 0.03 mrem/hour, 0.03-0.06 mrem/hour, and greater than 0.06 mrem/hour. The ranges can also be relative to a threshold value indicative of a normal exposure radiation. The ranges can further be based on an amount of normal background radiation. As used here, the "normal background radiation" is radiation from cosmic sources: naturally occurring radioactive material, including radon (except as a decay product of source or special nuclear material); and global fallout as it exists in the environment from the testing of nuclear explosive devices or from past nuclear accidents such as Chernobyl that contribute to background radiation. Background radiation does not include radiation from source, byproduct, or special nuclear materials regulated by regulatory agencies such as the US Nuclear Regulatory Commission.

In embodiments, first range of values can be indicative of a safer level of radiation exposure then the second range of values. The sample frequency can also be dynamically adjusted based on the dosage rate and a background radiation amount. The sample frequency can be increased when the dosage rate is less than a threshold value indicative of a normal background radiation amount and decreased when the dosage rate is greater than the threshold value.

Also provided are dosimeters, wearable devices, smartphones, and mobile computing devices capable of implementing aspects discussed herein. Such systems and methods can further comprise a location associated with each radiation level measurement. Some embodiments can store data locally and/or remotely, with the data comprising at least one of dosage rates, radiation level measurements, and location tracking data. Such data can be transferred to a remote computing device, via a wired method, a wireless method, e.g., Bluetooth, Wi-Fi, passing through a gateway, and the like.

BRIEF DESCRIPTION OF THE DRAWINGS

The summary, as well as the following detailed description, is further understood when read in conjunction with the appended drawings. For the purpose of illustrating the disclosed subject matter, there are shown in the drawings exemplary embodiments of the disclosed subject matter; however, the disclosed subject matter is not limited to the specific methods, compositions, and devices disclosed. In addition, the drawings are not necessarily drawn to scale. In the drawings:

FIG. 2B provides a flowchart for dynamic dose tracking and adjustment in accordance with embodiments of the present invention.

DETAILED DESCRIPTION OF ILLUSTRATIVE EMBODIMENTS

Figure 1:
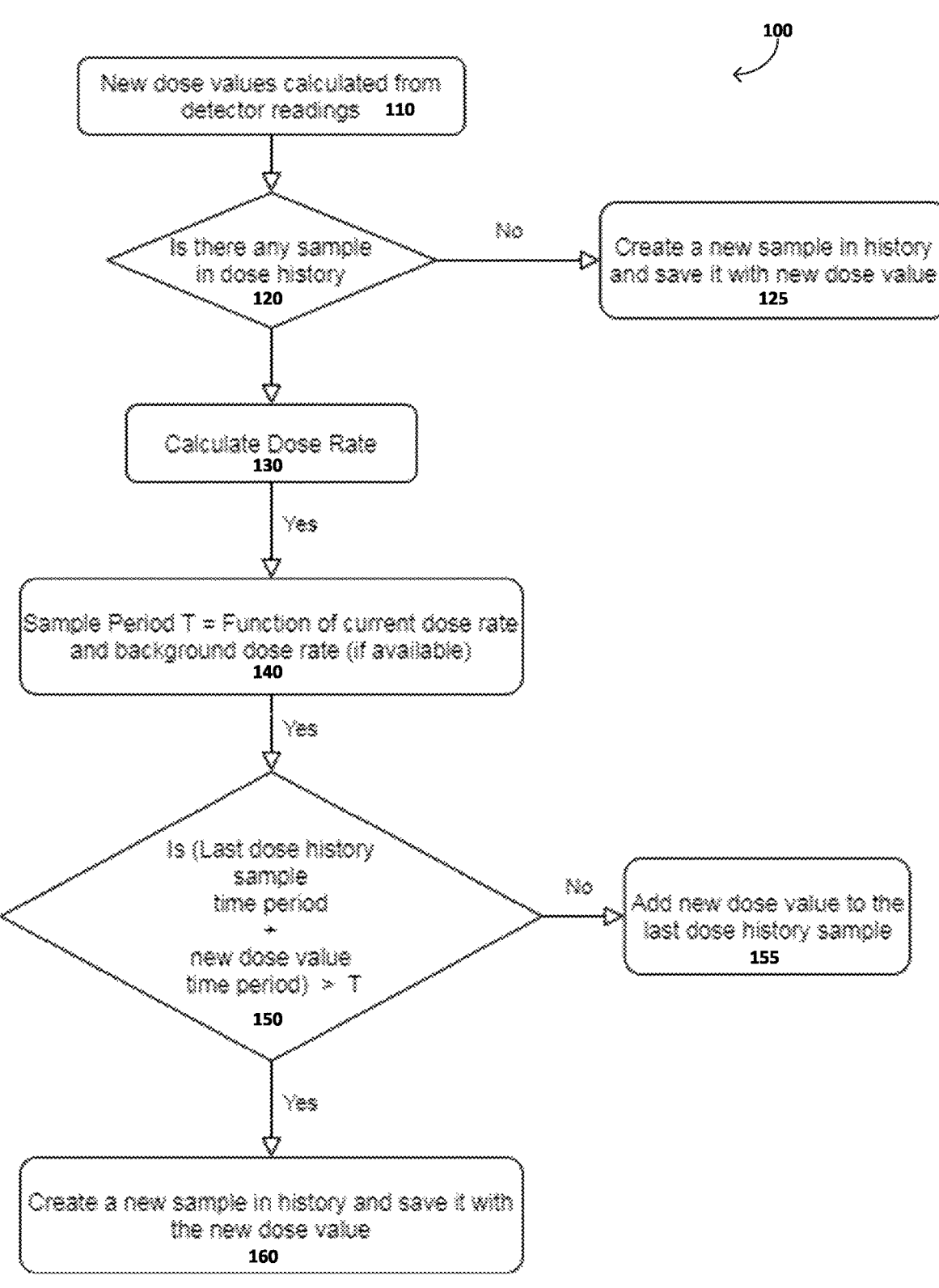
FIG. 1 provides a flowchart for dosage sampling in accordance with embodiments of the present invention.

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed subject matter.

Also, as used in the specification including the appended claims, the singular forms "a." "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. It is to be understood that the terminology used herein is for the purpose of describing particular aspects only and is not intended to be limiting.

It is to be appreciated that certain features of the disclosed subject matter which are, for clarity, described herein in the context of separate embodiments, can also be provided in combination in a single embodiment. Conversely, various features of the disclosed subject matter that are, for brevity, described in the context of a single embodiment, can also be provided separately or in any subcombination. Further, any reference to values stated in ranges includes each and every value within that range. Any documents cited herein are incorporated herein by reference in their entireties for any and all purposes.

In one aspect, the present disclosure provides systems and methods for analyzing and dynamically changing the dose history sample period on a dosimeter. Instead of storing dose history at a fixed interval time period, the present invention can utilize dose rate to dynamically change the dose history sample time period. In embodiments, dose history samples can be collected at longer intervals when the dose is normal, and at shorter interval when dose is high.

As a result, dynamic dose history sample time periods can provide more precise details on dose changes when the dose rate is high by creating finer dose samples and when dose rate is low (e.g., normal, background levels), the dose samples that are not much of an interest to the users are created at a longer sample time period. Accordingly, the present invention provides many unique advantages over traditional systems and methods Various embodiments relate to instruments on which dynamic dose history measurements can be performed, including but not limited to dosimeters, and wearable technology, such as personal devices, badges, computing devices, smartphones, and other mobile computing devices.

In embodiments, dose history sample periods will be longer when a radiation level is normal. A normal radiation level can be defined, for example, by a range defining a safe dose of radiation, when the measured radiation level is beneath a threshold amount, and the like. In such periods, where there is a normal, safe level of background radiation, the longer periods between samples result in a less number of samples during a given time. As such, the number of samples stored in history will be reduced compared to a period of higher sampling frequency, thus saving memory and allowing the recorded sample history to cover a longer time period.

When the dose rate gets above normal background dose rate, the sampling frequency can be dynamically adjusted to measure radiation levels more frequently. As such, more data can be collected during periods of high exposure. The increased sampling frequency can provide insight and information regarding the high dose event, including but not limited to a time indicating when the high dose event started and ended, measurement fluctuations over time, throughout a particular location, total dosage amounts, and dosage levels throughout the event.

In various embodiments, there can be multiple dosage ranges, with different sampling periods for the various dosage ranges. Each of the dosage ranges and the sampling periods can be fully customizable. For example, dosage ranges and sampling periods can be defined using one or more metrics, such as safe exposure levels, a length of time of exposure at certain levels, user preferences, and the like.

In some embodiments, the sampling frequency and ranges can be defined locally or remotely. In others, the sampling frequency and ranges can be dynamically updated, adjusted, and/or defined using prior data, machine learning, or other algorithms. Accordingly, systems and methods can more accurately identify periods of interest and collect data at time intervals useful to gain information about those periods of interest. Such features can enhance insights and allow users to view how dose values changed over time, with more precision than traditional methods.

Some embodiments can further comprise location sensors to identify a user position, e.g., GPS, relative to a sensor, within an area, etc., during dosage measurements, and throughout periods of interest.

Additional advantages of the present invention include improved battery life and improved data quality, since measurements and sampling frequency are dynamically adjusted based on dosage levels and periods of interest, rather than constantly operating and sampling at fixed sampling frequencies.

It will be appreciated that aspects of the present invention, including but not limited to variable data collection rate based on ambient condition monitoring could be applied to a plurality of fields. While the present disclosure discusses sampling radiation dosage levels, such systems and methods can be applied to various applications monitoring and/or identifying conditions of interest. For example, systems and methods of the present invention can be applied to measure other environmental conditions, such as oxygen levels, carbon monoxide levels, and the like.

FIG. 1 illustrates a flowchart with a dynamic dose history sampling method 100, in accordance with embodiments discussed herein. A detector, such as a dosimeter or other sensor, can identify a new dose value based on detector readings 110. In various embodiments the dose value can be the sensed detector reading. In other embodiments, dose values are calculated based on the detector readings. In embodiments, the detector readings and/or dose values can be a radiation level.

When a dose value is determined, dose history can be analyzed, and determination is made as to whether there is any sample in the dose history 120. As discussed herein, dose history can be stored at one or more memories and/or databases, which can be local or remote to the detector. If no samples are in the dose history 125, the system can create a new sample in the dose history log and save the new dose value.

If samples are contained in dose history, a dose rate can be calculated 130 based on the samples contained therein. Dose rates can be defined by a plurality of rates and units of interest, e.g., mrem/hour, and determined from one or more detector readings.

A sampling period, T, can then be determined based on the dose rate 140. In embodiments, the sampling period, T, is a function of the current dose rate and, optionally, the background dose rate. Background dose rate can be indicative of ambient conditions, e.g., background radiation levels, and the like. The background dose rate can be measured by a same or different detector, e.g., dosimeter. In embodiments, the background dose rate can be a measured value, an estimated value, a known value, and the like. The background dose rate can be useful to provide more accurate data regarding a current total exposure rate. As discussed herein, the sample period reflects periods of interest, e.g., periods of high radiation exposure, so that periods of high interest are sampled with a greater frequency than periods of low interest. Therefore, the sample period function, T, reflects this concept, and determines a shorter sample period when dose rates are higher (e.g., indicative of higher exposure) and a longer sample period when dose rates are lower (e.g., indicative of lower exposure). In various embodiments, the sample period function can incorporate additional variables to more accurately define periods of interest, and therefore refine the sample period, as desired. Similar to other concepts discussed herein, the sample period function can be customizable and reflect exposure rates, total exposure times, and variables of interest.

Sample period, T, can then be compared to a sum of a last dose history sample time period, and a new dose value time period 150. If the last dose history sample time period and the new dose value time period is less than or equal to the determined sample period, T, then the new dose value is added to the last dose history sample 155. If the last dose history sample time period and the new dose value time period is greater than the determined sample period. T, then a new sample is created in the dose history and saved with the new dose value 160.

The above determination can be particularly useful to identify a high dosage exposure, or other exposure event of interest. The determination is further useful to track a level of exposure, e.g., to ensure the safety of an individual within the vicinity of the dosimeter or sensor device taking the measurements.

Figure 2A:
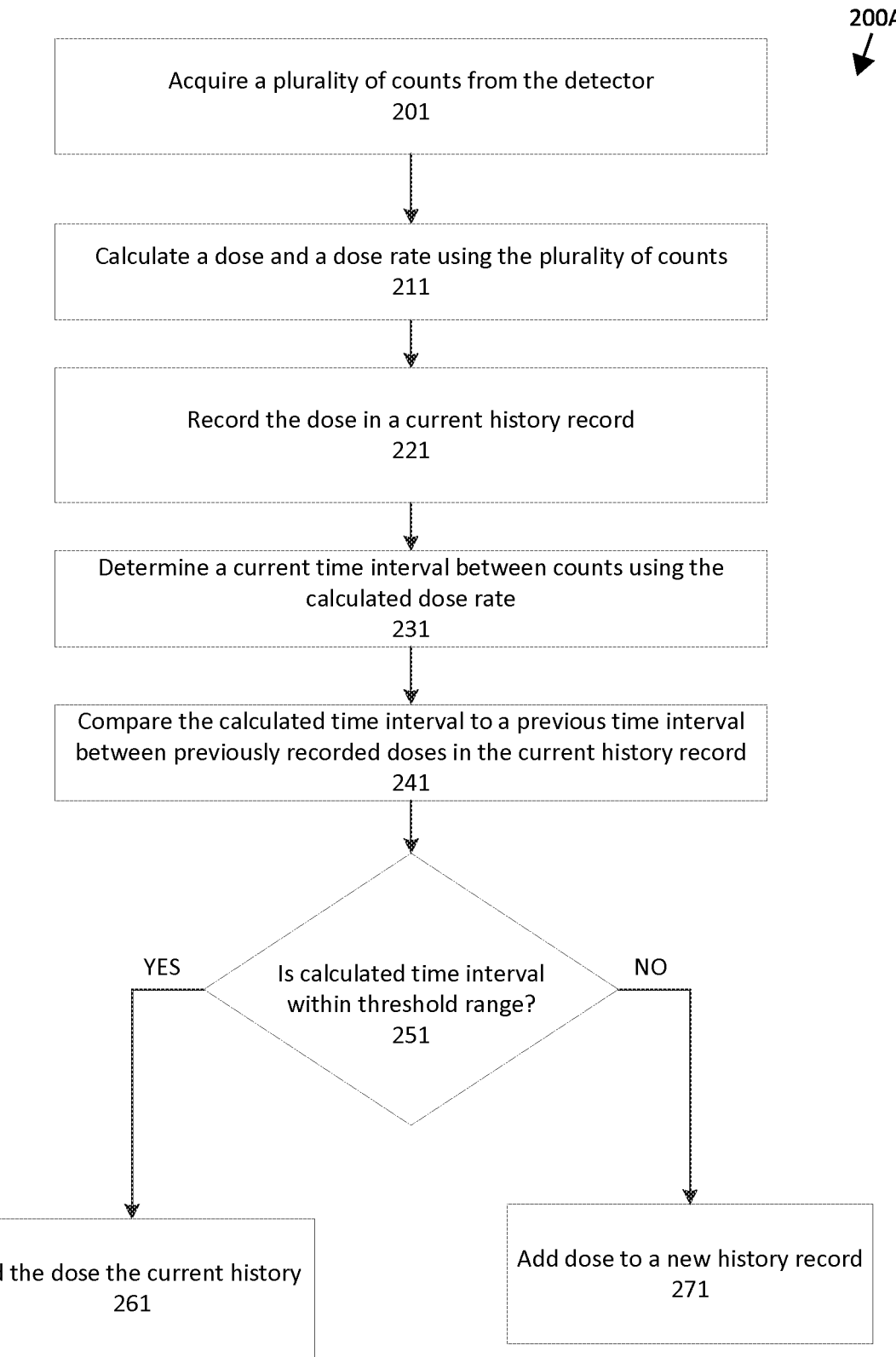
FIG. 2A provides a flowchart for dynamic dose tracking and adjustment in accordance with embodiments of the present invention.

FIG. 2A illustrates an example method 200A in accordance with embodiments disclosed herein. The method 200A includes acquiring a plurality of counts from a detector 201, calculating a dose and a dose rate using the plurality of counts 211, recording the dose in a current history record 221, determining a current time interval between counts using the calculated dose rate 231, and comparing the calculated time interval to a previous time interval between previously recorded doses in the current history record 241. Based on the calculated time interface being within a threshold range 251, the method further includes adding the dose to the current history 261 if the calculated time interface is within the threshold range 251, or adding dose to a new history record 271 if the calculated time interface is not within the threshold range 251.

FIG. 2B illustrates an example method 200B in accordance with embodiments disclosed herein. The method 200B includes acquiring a plurality of count values from a detector 215, calculating a dose rate value based on the plurality of count values 225, determining a first sample frequency based on the dose rate value 235, generating a history record configured to store a plurality of dose values based on the first sample frequency 245, and adjusting the first sample frequency to a second sample frequency based on the dose values 255.

Figure 2C:
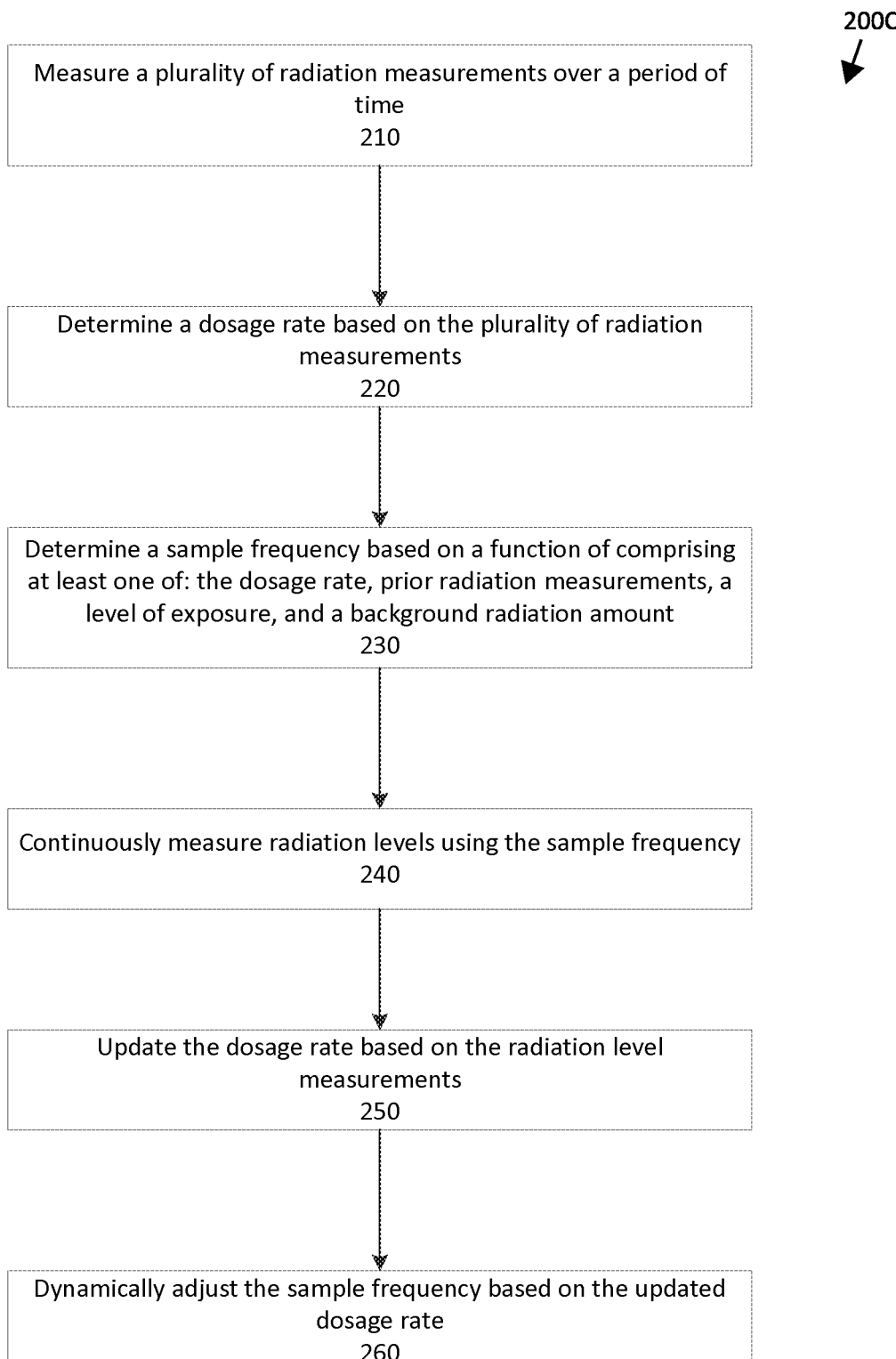
FIG. 2C provides a flowchart for dynamic dose tracking and adjustment in accordance with embodiments of the present invention.

FIG. 2C illustrates an example method for dynamic dose tracking 200C in accordance with embodiments discussed herein. A sensor for measuring an exposure level, e.g., radiation, can take a plurality of measurements over a period of time 210. It will be appreciated that such measurements can be taken using any of a plurality of devices and objects, such as a dosimeter, and be attached to, incorporated in, and otherwise associated with one or more of a wearable device, a dosimeter, a smartphone, and a mobile computing device. The plurality of radiation measurements can further be stored in a memory or other database, which can be local and/or remote to the sensor.

The plurality of radiation measurements can be used to determine a dosage rate 220. For example, a time can be associated with each radiation measurement, and the dosage rate can be calculated accordingly. In a similar manner, the sensor can be set to measure a radiation level at a certain sample frequency. e.g., once per minute, and the dosage rate determined accordingly. In various embodiments, the sample frequency can be automatically determined, preset to a certain initial sample frequency, and the like. It will be appreciated that any of a plurality of methods can be implemented to determine the dosage rate from the plurality of radiation measurements taken over a period of time 210.

A sample frequency can be determined based on a function utilizing at least one of the dosage rate, prior radiation measurements, a level of exposure, and a background radiation amount 230. In embodiments, the sample frequency can be primarily based on a function using the dose rate. In examples, as discussed herein, radiation levels can be measured at a first sample frequency when the dosage rate is determined to be within a first range of values, and measured at a second sample frequency when the dosage rate determined to be within a second range of values greater than the first range. In various embodiments, the second sample frequency is greater than the first sample frequency. In other embodiments, radiation levels can be measured at a third sample frequency when the dosage rate is determined to be within a third range of values, with the third sample frequency being greater than the second sample frequency. It will be appreciated that the sample frequency can be adjusted to any of a plurality of frequencies and time periods, based on the specific goals for tracking dosage history. Sample frequency determinations can further be adjusted based on one or more variables, such as estimated background radiation, an ideal level of exposure, tracking throughout a certain area or location, a threshold value, individual considerations, and the like.

Radiation levels can be continuously measured using the determined sample frequency 240. The dosage rate can be updated and calculated based on those continuous radiation level measurements 250, and the sample frequency can be dynamically adjusted based on the updated dosage rate 260. In this manner, the level of exposure can be tracked and tailored. For example, when the sensor identifies higher rates of radiation exposure over a given time, thus indicating a dosage rate increase, embodiments of the present invention increase the sampling frequency so that more accurate dose history can be obtained. When the sensor identifies lower rates of radiation exposure over a given time, the sample frequency can be decreased, thus resulting in longer time periods between samples. The dynamic adjustment of dose history tracking results in more effective tracking methods, an extended battery life for many dosimeters, and more efficient memory allocation.

In an example of the systems and methods discussed herein, a dosimeter, such as an electronic dosimeter, can calculate dose rate instantaneously when dose values are calculated from detector readings. Instead of only using a fixed time period for dose samples in history, the dose rate value can be used in determining the dose history sample period, i.e., the sample frequency. When the dosage rate meets or exceeds a threshold value, the sample period can be dynamically adjusted to an appropriate interval. The premise behind such adjustments is that higher dose rates are likely to be indicative of a period of interest. For example, at higher dose rates, users are likely to be interested in knowing when and how the dose is changing, so accurate exposure levels can be measured to ensure the individual is exposed to a safe amount of radiation. Accordingly, the dose history sample period during higher dose rate periods can be shorter. Similarly, the dose history sample period can be longer during times when the dose rate is around normal background dose rate. The sample period can be dynamically calculated based on a function of the current dose rate.

In various embodiments, the sample period, or sample frequency, can be determined based on a simple lookup table. Table 1 provides an example of a dose history sample time period based on ranges of dose rates.

TABLE 1

| Dose Rate (mrem/hour) | Dose History Sample Time Period (mins) |
|---|---|
| Less than 0.03 | 60 |
| 0.03 to 0.06 | 15 |
| Greater than 0.06 | 5 |

The dose history sample period function can also use background dose rate calculated using control dosimeters which are normally in dosimeter service. Electronic dosimeters, when communicating with a dosimetry system to report dose values (see, e.g., FIG. 3), can get the background dose rate from the dosimetry system to use it for dose history sample period calculation. Table 2 provides another example of a sample frequency determination based on dosage rates.

TABLE 2

| Dose Rate (mrem/hour) | Dose History Sample Time Period (mins) |
|---|---|
| Less than normal background | 60 |
| Normal background to 2 times normal background | 15 |
| Greater than 2 times the normal background | 5 |

It will be appreciated that while the above examples describe dose rates in millirem/hour, a plurality of units and measurements can be utilized in accordance with embodiments discussed herein. Dose rates, threshold values, and sample frequencies can be automatically or manually determined, tailored to suit a specific individual, location, area, standard, and the like. The present invention is not limited towards particular methods of measurement. The threshold values and relationships between dose rate and sample time periods are provided for exemplary purposes. Those of ordinary skill in the art would appreciate that any of a plurality of measurement methods, functions, units, and values can be implemented in accordance with embodiments.

Figure 3:
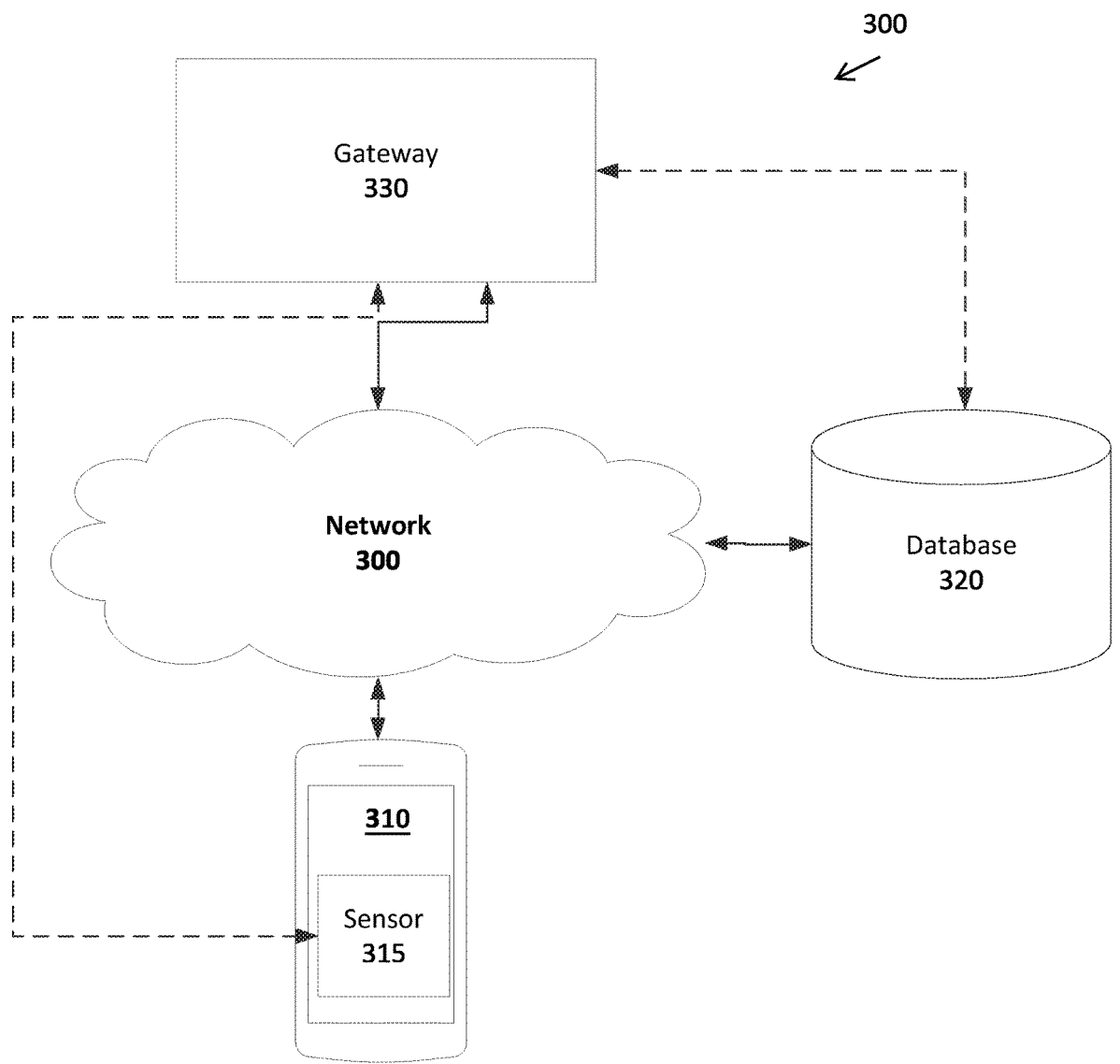
FIG. 3 illustrates an example network in accordance with embodiments of the present invention.

FIG. 3 illustrates an example network configuration on which systems, methods, and other embodiments of the present invention can be applied. As discussed herein, a sensor 315 can be a dosimeter or other device for measuring radiation levels. The sensor 315 can form a part of, or otherwise be associated with another device 310, such as a smartphone, dosimeter device, a computing device, or other mobile computing device. In various embodiments, the sensor 315 and connected device 310 can be the same device, separate devices, and/or otherwise in communication with each other. One or both devices can be connected to a network 300, as discussed herein. The network can be in further communication with a database and/or a gateway 330. The gateway and the database can also optionally be in communication with each other.

The sensor 315 and 310 can be configured to communicate data obtained at the sensor 315 to the database 320 via the network 300. In examples, the data can comprise a plurality of types of data, including but not limited to radiation level measurements, dosage rates, location, time, background radiation, and the like.

In some embodiments the sensor 315 and device 310 can be configured to communicate with a gateway, in a wired and/or wireless fashion, e.g., Bluetooth, WiFi, and the like. In an example, a sensor device can pass by or through a gateway, which receives the data obtained by the sensor 315. The gateway can then store and/or transfer the data to the database, which can be local or remote to the gateway itself. Any or all of the components can be connected to the network, which can be a cloud network connected to one or more computing devices as discussed herein.

By way of example and without limitation, cloud computing systems can be used to perform aspects of the disclosed subject matter. Cloud-based computing generally refers to networked computer architectures where application execution, service provision, and data storage can be divided, to some extent, between clients and cloud computing devices. The "cloud" can refer to a service or a group of services accessible over a network. e.g., the Internet, by clients, server devices, and by other cloud computing systems, for example.

In one example, multiple computing devices connected to the cloud can access and use a common pool of computing power, services, applications, storage, and files. Thus, cloud computing enables a shared pool of configurable computing resources. e.g., networks, servers, storage, applications, and services, that can be provisioned and released with minimal management effort or interaction by the cloud service provider.

As an example, a cloud-based application can store copies of data and/or executable program code in the cloud computing system, while allowing client devices to download at least some of this data and program code as needed for execution at the client devices. In some examples, downloaded data and program code can be tailored to the capabilities of specific client devices. e.g., a personal computer, tablet computer, mobile phone, and/or smartphone, accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code can be dynamically delivered, as needed or otherwise, to various clients accessing the cloud-based application. Details of the cloud-based computing architecture can be largely transparent to users of client devices. By way of example and without limitation, a PC user device accessing a cloud-based application can not be aware that the PC downloads program logic and/or data from the cloud computing system, or that the PC offloads processing or storage functions to the cloud computing system, for example.

Network 300 can include one or more cloud services, one or more cloud platforms, cloud infrastructure components, and cloud knowledge bases. Network 300 can include more or fewer components, and each of service. e.g., cloud services, platforms, infrastructure components, and knowledge bases can include multiple computing and storage elements as well. Thus, one or more of the described functions of network 300 and any cloud computing systems can be divided into additional functional or physical components or combined into fewer functional or physical components. In some further examples, additional functional and/or physical components can be added to the examples shown in FIG. 1. Delivery of computing-based services, as discussed herein can involve multiple cloud components communicating with each other over application programming interfaces, such as web services and multi-tier architectures, for example.

FIG. 3 represents but one example of a networked computing architecture. Such architectures can represent queues for handling requests from one or more client devices 310, 315, 330. Cloud platforms can include client-interface frontends for cloud computing system, such as client-interface frontends of a messaging service. Cloud platforms can be coupled to cloud services to perform functions for interacting with client devices. Cloud infrastructure 108 can include service, recording, analysis, and other operational and infrastructure components of cloud computing systems. Cloud knowledge bases can be configured to store data for use by network 300, and thus, cloud knowledge bases can be accessed by any of cloud services, platforms, and/or infrastructure components.

Many different types of client devices, such as devices of users of the messaging service, can be configured to communicate with components of network 300 for the purpose of accessing data and executing applications provided by one or more processors and computing systems. For example, the sensor 315, device 310, database 320, and gateway 330 are shown as examples of the types of client devices that can be configured to communicate with network 300. Of course, more or fewer or other types of client devices can communicate with network 300.

As discussed herein any type of computing device, e.g., PC, laptop computer, tablet computer, etc., and mobile device, e.g., laptop, smartphone, mobile telephone, cellular telephone, tablet computer, etc., can be configured to transmit and/or receive data to and/or from network 300. Similarly, gateway 330 can be any type of computing device with a transmitter/receiver including a laptop computer, a mobile telephone, a smartphone, a tablet computer etc., which is configured to transmit/receive data to/from network 300.

In FIG. 3, communication links between client devices and network 300 can include wired connections, such as a serial or parallel bus, Ethernet, optical connections, or other type of wired connection. Communication links can also be wireless links, such as Bluetooth, IEEE 802.11 (IEEE 802.11 can refer to IEEE 802.11-2007, IEEE 802.11n-2009, or any other IEEE 802.11 revision), CDMA, 3G, GSM, WiMAX, or other wireless based data communication links.

In other examples, the client devices can be configured to communicate with network 300 via wireless access points. Access points can take various forms. For example, an access point can take the form of a wireless access point (WAP) or wireless router. As another example, if a client device connects using a cellular air-interface protocol, such as CDMA, GSM, 3G, or 4G, an access point can be a base station in a cellular network that provides Internet connectivity via the cellular network.

As such, the client devices can include a wired or wireless network interface through which the client devices can connect to network 300 directly or via access points. As an example, the client devices can be configured to use one or more protocols such as 802.11, 802.16 (WiMAX), LTE, GSM, GPRS, CDMA, EV-DO, and/or HSPDA, among others. Furthermore, the client devices can be configured to use multiple wired and/or wireless protocols, such as "3G" or "4G" data connectivity using a cellular communication protocol, e.g., CDMA, GSM, or WiMAX, as well as for "WiFi" connectivity using 802.11. Other types of communications interfaces and protocols could be used as well.

The above described aspects of the disclosure have been described with regard to certain examples and embodiments, which are intended to illustrate but not to limit the disclosure. It should be appreciated that the subject matter presented herein can be implemented as a computer process, a computer-controlled apparatus or a computing system or an article of manufacture, such as a computer-readable storage medium.

Those skilled in the art will also appreciate that the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, biometric devices, mobile computing devices, special-purposed hardware devices, network appliances, and the like. The embodiments described herein can also be practiced in distributed computing environments, where tasks are performed by remote processing devices that are linked through a communications network. In a distributed computing environment, program modules can be located in both local and remote memory storage devices.

A number of different types of computing devices can be used singly or in combination to implement the resources and services in different embodiments, including general-purpose or special-purpose computer servers, storage devices, network devices, and the like. In at least some embodiments, a server or computing device that implements at least a portion of one or more of the technologies described herein, including the techniques to implement the functionality of aspects discussed herein.

Figure 4:
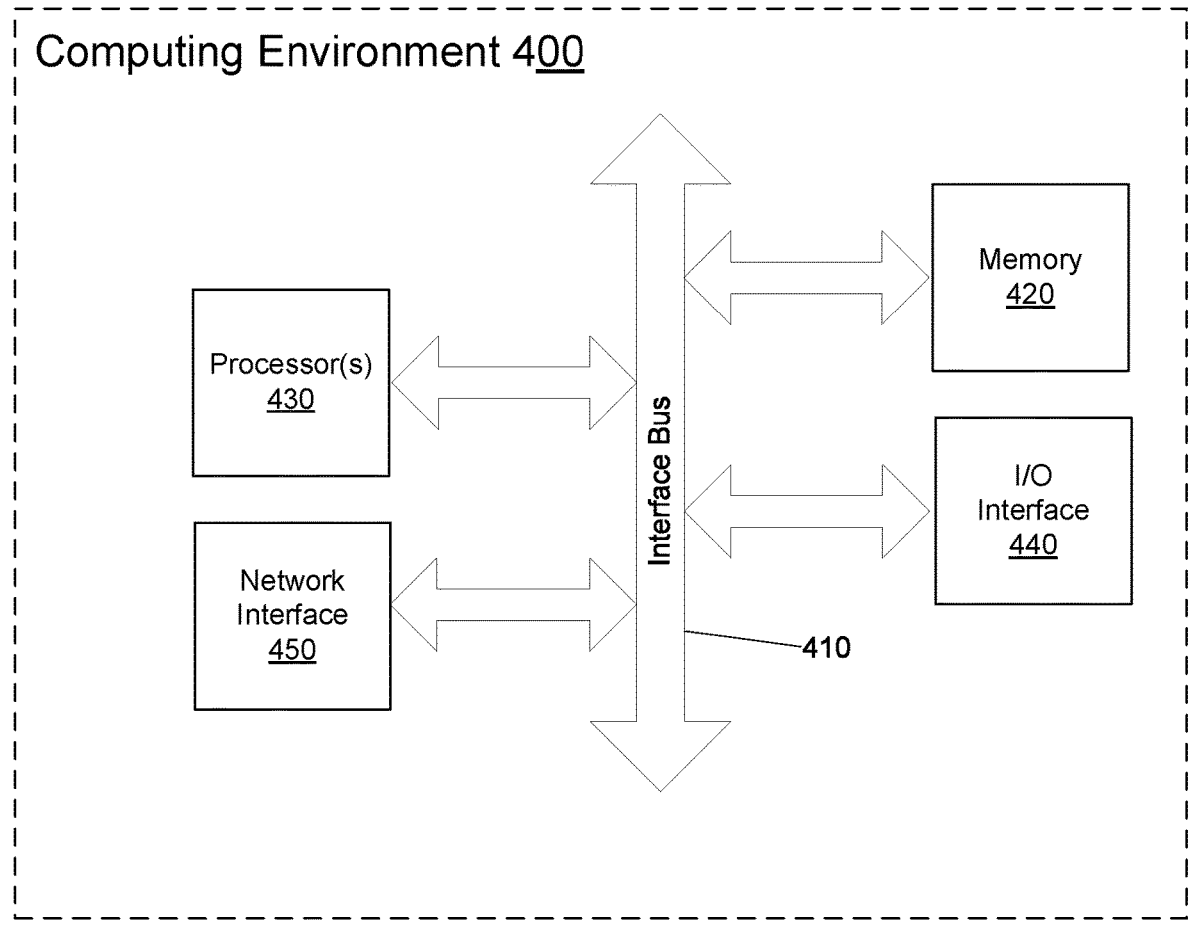
FIG. 4 illustrates a computing system in accordance with embodiments of the present invention.

FIG. 4 depicts an example computing environment 400 suitable for implementing aspects of the embodiments of the present invention, including the control system, which can integrate one or more devices, computing, and lighting systems. As utilized herein, the phrase "computing system" generally refers to a dedicated computing device with processing power and storage memory, which supports operating software that underlies the execution of software, applications, and computer programs thereon. As used herein, an application is a small, in storage size, specialized program that is downloaded to the computing system or device. As shown by FIG. 4, computing environment 400 includes bus 410 that directly or indirectly couples the following components: memory 420, one or more processors 430, I/O interface 440), and network interface 450. Bus 410 is configured to communicate, transmit, and transfer data, controls, and commands between the various components of computing environment 400.

Computing environment 400 typically includes a variety of computer-readable media. Computer-readable media can be any available media that is accessible by computing environment 400 and includes both volatile and nonvolatile media, removable and non-removable media. Computer-readable media can comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM: ROM: EE-PROM: flash memory or other memory technology: CD-ROMs: DVDs or other optical disk storage: magnetic cassettes, magnetic tape, magnetic disk storage or other magnetic storage devices: or other mediums or computer storage devices which can be used to store the desired information and which can be accessed by computing environment 400.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 420 includes computer-storage media in the form of volatile and/or nonvolatile memory. The memory can be removable, non-removable, or a combination thereof. Memory 420 can be implemented using hardware devices such as solid-state memory, hard drives, optical-disc drives, and the like. Computing environment 400 also includes one or more processors 430 that read data from various entities such as memory 420, I/O interface 440, and network interface 450.

I/O interface 440 enables computing environment 400 to communicate with different input devices and output devices. Examples of input devices include a keyboard, a pointing device, a touchpad, a touchscreen, a scanner, a microphone, a joystick, and the like. Examples of output devices include a display device, an audio device (e.g., speakers), a printer, and the like. These and other I/O devices are often connected to processor 410 through a serial port interface that is coupled to the system bus, but can be connected by other interfaces, such as a parallel port, game port, or universal serial bus (USB). A display device can also be connected to the system bus via an interface, such as a video adapter which can be part of, or connected to, a graphics processor unit. I/O interface 440 is configured to coordinate I/O traffic between memory 420, the one or more processors 430, network interface 450, and any combination of input devices and/or output devices.

Network interface 450 enables computing environment 400 to exchange data with other computing devices via any suitable network. In a networked environment, program modules depicted relative to computing environment 400, or portions thereof, can be stored in a remote memory storage device accessible via network interface 450. It will be appreciated that the network connections shown are exemplary and other means of establishing a communications link between the computers can be used.

Exemplary Aspects

The following Aspects are illustrative only and should not be understood as limiting the scope of the present specification or the scope of the appended claims.

Aspect 1. A system for dynamically tracking radiation exposure, comprises a sensor configured to measure a radiation level: at least one memory storing dosage rates; and a processor in communication with the at least one memory and the sensor. The processor can be configured to at least: determine a dosage rate based on a plurality of radiation level measurements taken over a period of time: determine a sample frequency based on a function of the dosage rate: continuously measure the radiation levels using the sample frequency and update the dosage rate; and dynamically adjust the sample frequency based on the updated dosage rate.

Aspect 2. The system of Aspect 1, wherein dynamically adjusting the sample frequency further comprises: measuring radiation levels at a first sample frequency when the dosage rate is determined to be within a first range of values; and measure radiation levels at a second sample frequency when the dosage rate determined to be within a second range of values, the second range of values being greater than the first range of values, wherein the second sample frequency is greater than the first sample frequency.

Aspect 3. The system of any of Aspect 2, further comprising measuring radiation levels at a third sample frequency when the dosage rate is determined to be within a third range of values, wherein the third sample frequency is greater than the second sample frequency.

Aspect 4. The system of Aspect 2, wherein the first range of values is indicative of a safer level of radiation exposure then the second range of values.

Aspect 5. The system of any of Aspects 1-4, wherein the sample frequency is dynamically adjusted based on the dosage rate and a background radiation amount.

Aspect 6. The system of Aspect 5, wherein the sample frequency is increased when the dosage rate is less than a threshold value indicative of a normal background radiation amount and decreased when the dosage rate is greater than the threshold value.

Aspect 7. The system of Aspect 6, wherein the sample frequency is further decreased when the dosage rate is greater than two times the threshold value.

Aspect 8. The system of Aspect 7, wherein the threshold value is 0.03 mrem.

Aspect 9. The system of any of Aspects 1-8, wherein the sensor is at least one of: a wearable device, a dosimeter, a smartphone, and a mobile computing device.

Aspect 10. A dosimeter, comprising: a processor, and a memory storing instructions thereon causing the processor to at least: determine a dosage rate based on a plurality of radiation level measurements taken over a period of time: determine a sample frequency based on a function of the dosage rate: continuously measure the radiation levels using the sample frequency and update the dosage rate; and dynamically adjust the sample frequency based on the updated dosage rate.

Aspect 11. The dosimeter of Aspect 10, wherein the memory is configured to store data comprising the dosage rates and radiation level measurements, and the memory further comprises instructions to cause the processor to transfer the data to a remote computing device.

Aspect 12. The dosimeter of Aspect 10, the data further comprises a location associated with each radiation level measurement.

Aspect 13. The dosimeter of any of Aspects 10-12, wherein the instructions that cause the processor to dynamically adjust the sample frequency further comprise: measuring radiation levels at a first sample frequency when the dosage rate is determined to be within a first range of values; and measuring radiation levels at a second sample frequency when the dosage rate is determined to be within a second range of values, the second range of values being greater than the first range of values, wherein the second sample frequency is greater than the first sample frequency.

Aspect 14. The dosimeter of Aspect 13, wherein the instructions further comprise measuring radiation levels at a third sample frequency when the dosage rate is determined to be within a third range of values, wherein the third sample frequency is greater than the second sample frequency.

Aspect 15. The dosimeter of Aspect 13, wherein the first range of values is indicative of a safer level of radiation exposure then the second range of values.

Aspect 16. The dosimeter of any of Aspects 10-15, wherein the sample frequency is dynamically adjusted based on the dosage rate and a background radiation amount.

Aspect 17. The dosimeter of Aspect 16, wherein the sample frequency is increased when the dosage rate is less than a threshold value indicative of a normal background radiation amount and decreased when the dosage rate is greater than the threshold value.

Aspect 18. The dosimeter of Aspect 17, wherein the sample frequency is further decreased when the dosage rate is greater than two times the threshold value.

Aspect 19. A method for dynamically tracking radiation exposure, comprising determining a dosage rate based on a plurality of radiation level measurements taken over a period of time: determining a sample frequency based on a function of the dosage rate: continuously measuring the radiation levels using the sample frequency and updating the dosage rate; and dynamically adjusting the sample frequency based on the updated dosage rate.

Aspect 20. The method of Aspect 19, wherein the sample frequency is dynamically adjusted to increase based on an increase of the dosage rate.

Aspect 21. The method of any of Aspects 19-20, further comprising initiating a notification when dosage rate exceeds a threshold value indicative of an unsafe exposure.

Aspect 22. The method of any of Aspects 19-21, wherein dynamically adjusting the sample frequency further comprises: measuring radiation levels at a first sample frequency when the dosage rate is determined to be within a first range of values; and measuring radiation levels at a second sample frequency when the dosage rate is determined to be within a second range of values, the second range of values being greater than the first range of values, wherein the second sample frequency is greater than the first sample frequency.

Aspect 23. The method of Aspect 22, further comprising measuring radiation levels at a third sample frequency when the dosage rate is determined to be within a third range of values, wherein the third sample frequency is greater than the second sample frequency.

Aspect 24. The method of Aspect 23, wherein the first range of values is indicative of a safer level of radiation exposure then the second range of values.

Aspect 25. The method of Aspect 22, wherein the sample frequency is dynamically adjusted based on the dosage rate and a background radiation amount.

Aspect 26. The method of Aspect 25, wherein the sample frequency is increased when the dosage rate is less than a threshold value indicative of a normal background radiation amount and decreased when the dosage rate is greater than the threshold value.

Aspect 27. The method of Aspect 26, wherein the sample frequency is further decreased when the dosage rate is greater than two times the threshold value.

What is claimed:

1. A system for dynamically tracking radiation exposure, comprising
  a sensor configured to measure a radiation level;
  at least one memory storing dosage rates:
  a processor in communication with the at least one memory and the sensor, the processor configured to at least:
    determine a dosage rate based on a plurality of radiation level measurements taken over a period of time:
    determine a sample frequency based on a function of the dosage rate:
    continuously measure the radiation levels using the sample frequency and update the dosage rate; and
    dynamically adjust the sample frequency based on the updated dosage rate.

2. The system of claim 1, wherein dynamically adjusting the sample frequency further comprises:
  measuring radiation levels at a first sample frequency when the dosage rate is determined to be within a first range of values; and
  measuring radiation levels at a second sample frequency when the dosage rate determined to be within a second range of values, the second range of values being greater than the first range of values, wherein the second sample frequency is greater than the first sample frequency.

3. The system of claim 2, further comprising measuring radiation levels at a third sample frequency when the dosage rate is determined to be within a third range of values, wherein the third sample frequency is greater than the second sample frequency.

4. The system of claim 2, wherein the first range of values is indicative of a safer level of radiation exposure then the second range of values.

5. The system of claim 1, wherein the sample frequency is dynamically adjusted based on the dosage rate and a background radiation amount.

6. The system of claim 5, wherein the sample frequency is increased when the dosage rate is less than a threshold value indicative of a normal background radiation amount and decreased when the dosage rate is greater than the threshold value.

7. The system of claim 6, wherein the sample frequency is further decreased when the dosage rate is greater than two times the threshold value.

8. The system of claim 1, wherein the sensor is at least one of: a wearable device, a dosimeter, a smartphone, and a mobile computing device.

9. A dosimeter, comprising:
a processor, and a memory storing instructions thereon causing the processor to at least:
determine a dosage rate based on a plurality of radiation level measurements taken over a period of time:
determine a sample frequency based on a function of the dosage rate:
continuously measure the radiation levels using the sample frequency and update the dosage rate; and
dynamically adjust the sample frequency based on the updated dosage rate.

10. The dosimeter of claim 9, wherein the memory is configured to store data comprising the dosage rates and radiation level measurements, and the memory further comprises instructions to cause the processor to transfer the data to a remote computing device.

11. The dosimeter of claim 10, the data further comprises a location associated with each radiation level measurement.

12. The dosimeter of claim 10, wherein the instructions that cause the processor to dynamically adjust the sample frequency further comprise:
measuring radiation levels at a first sample frequency when the dosage rate is determined to be within a first range of values; and measuring radiation levels at a second sample frequency when the dosage rate is determined to be within a second range of values greater than the first range, wherein the second sample frequency is greater than the first sample frequency.

13. The dosimeter of claim 9, wherein the sample frequency is dynamically adjusted based on the dosage rate and a background radiation amount.

14. The dosimeter of claim 13, wherein the sample frequency is increased when the dosage rate is less than a threshold value indicative of a normal background radiation amount and decreased when the dosage rate is greater than the threshold value.

15. A method for dynamically tracking radiation exposure, comprising:
determining a dosage rate based on a plurality of radiation level measurements taken over a period of time:
determining a sample frequency based on a function of the dosage rate:
continuously measuring the radiation levels using the sample frequency and updating the dosage rate; and
dynamically adjusting the sample frequency based on the updated dosage rate.

16. The method of claim 15, wherein the sample frequency is dynamically adjusted to increase based on an increase of the dosage rate.

17. The method of claim 15, further comprising initiating a notification when dosage rate exceeds a threshold value indicative of an unsafe exposure.

18. The method of claim 15, wherein dynamically adjusting the sample frequency further comprises:
measuring radiation levels at a first sample frequency when the dosage rate is determined to be within a first range of values; and
measuring radiation levels at a second sample frequency when the dosage rate is determined to be within a second range of values greater than the first range, wherein the second sample frequency is greater than the first sample frequency.

19. The method of claim 18, further comprising measuring radiation levels at a third sample frequency when the dosage rate is determined to be within a third range of values, wherein the third sample frequency is greater than the second sample frequency.

20. The method of claim 18, wherein the sample frequency is dynamically adjusted based on the dosage rate and a background radiation amount.

* * * * *